United States Patent [19]
Czumak et al.

[11] Patent Number: 4,568,163
[45] Date of Patent: Feb. 4, 1986

[54] CAMERA BACK

[75] Inventors: Frank M. Czumak, Salem, N.H.; Joseph A. Stella, Peabody; Joseph H. Wright, No. Andover, both of Mass.

[73] Assignee: Polaroid Corporation, Cambridge, Mass.

[21] Appl. No.: 675,759

[22] Filed: Nov. 28, 1984

[51] Int. Cl.[4] .................. G03B 17/02; G03B 17/50
[52] U.S. Cl. ..................... 354/88; 354/174; 354/212; 354/277; 354/283
[58] Field of Search ............ 354/83, 84, 85, 86, 354/87, 88, 174, 178, 180, 181, 182, 276, 277, 283, 284, 212

[56] References Cited

U.S. PATENT DOCUMENTS

| | | | |
|---|---|---|---|
| 2,873,658 | 2/1959 | Land | 354/180 |
| 3,225,671 | 12/1965 | Friedman | 354/174 |
| 3,369,470 | 2/1968 | Downey | 354/86 |
| 3,443,500 | 5/1969 | Norton et al. | 354/180 |
| 3,525,293 | 8/1970 | Harvey | 354/86 |
| 3,541,938 | 11/1970 | Harvey | 354/85 |
| 3,541,939 | 11/1970 | Kamp | 354/180 |
| 3,868,709 | 2/1975 | Douglas | 354/212 |
| 4,114,166 | 9/1978 | Driscoll et al. | 354/76 |
| 4,132,471 | 1/1979 | Svatek et al. | 354/86 |
| 4,172,647 | 10/1979 | Gold | 354/86 |
| 4,236,798 | 12/1980 | Sylvester | 354/181 |
| 4,318,601 | 3/1982 | Martin | 354/180 |

Primary Examiner—A. A. Mathews
Attorney, Agent, or Firm—Alfred E. Corrigan

[57] ABSTRACT

Apparatus, e.g., a camera back, for locating a film cassette containing a plurality of individual, pre-mounted transparency film frames of the self-developing type in position for exposure. The apparatus includes a light-tight chamber into which the film frames are moved subsequent to their exposure. After the exposure of one or more of the film frames, the apparatus may be coupled to a film processor wherein the exposed film frames are individually removed from the lighttight chamber, processed, and delivered to the operator. The apparatus also includes a film advancing member which automatically removes a dark slide from the film cassette as it is being loaded into the apparatus.

11 Claims, 20 Drawing Figures

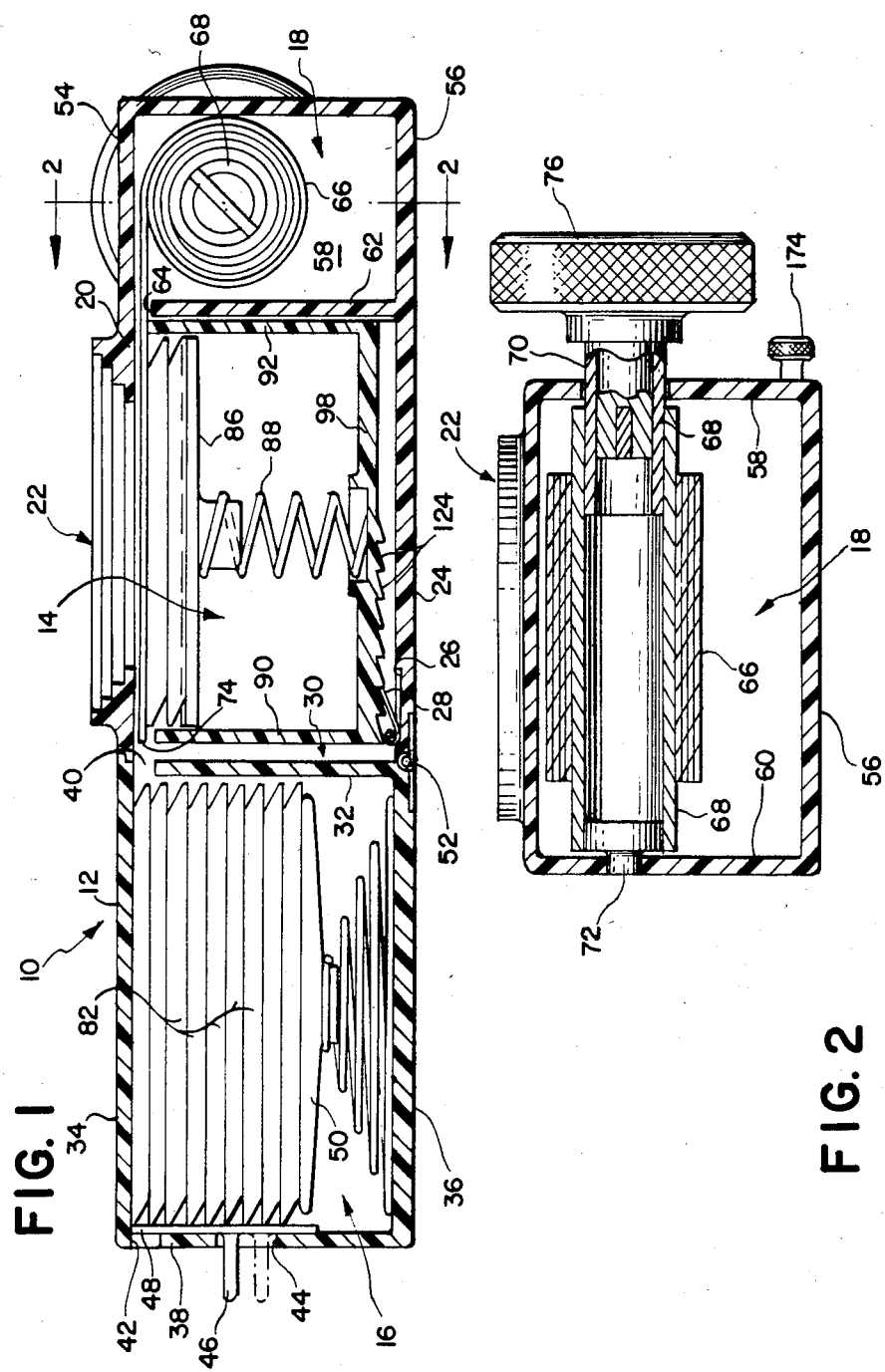

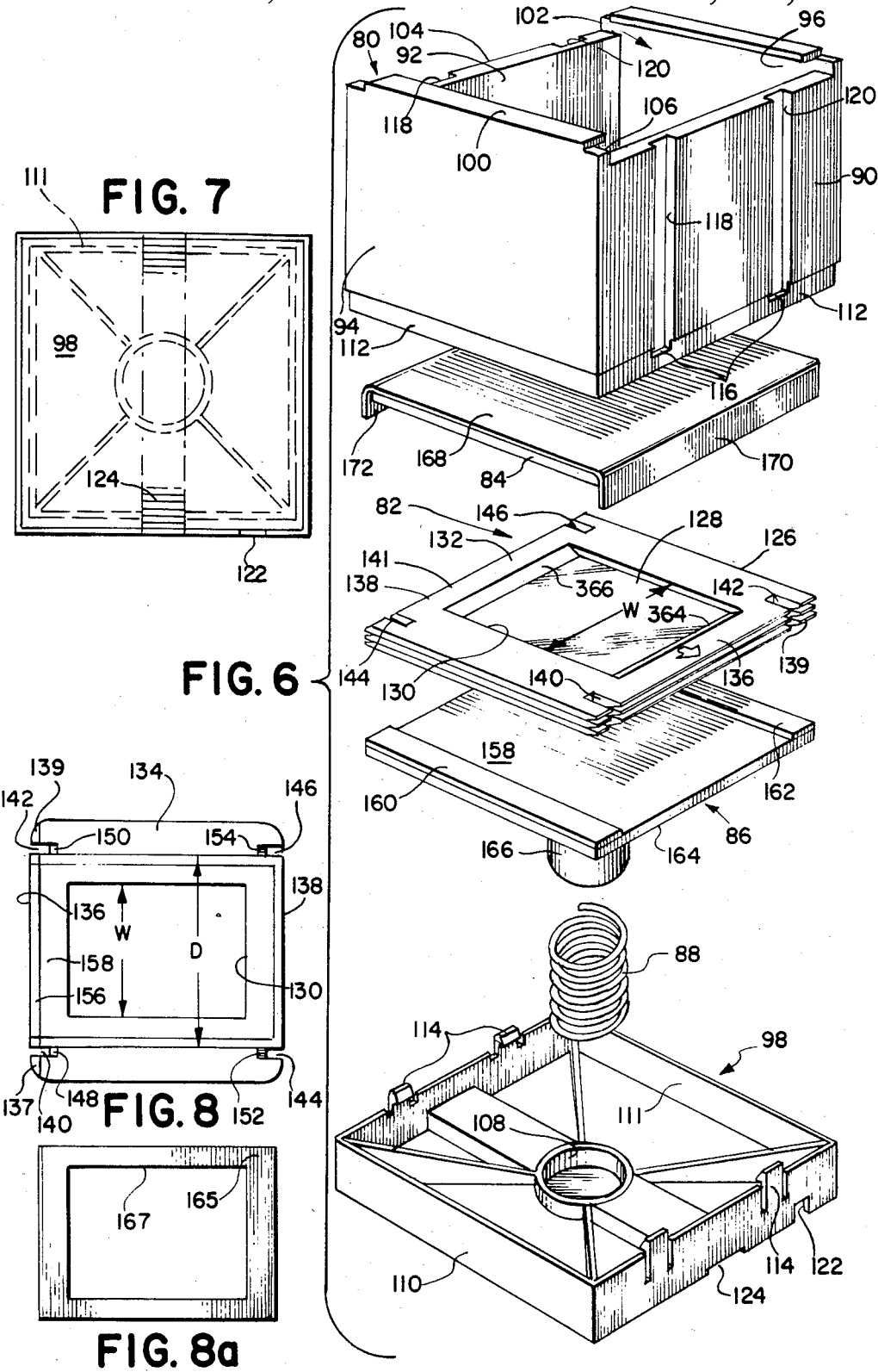

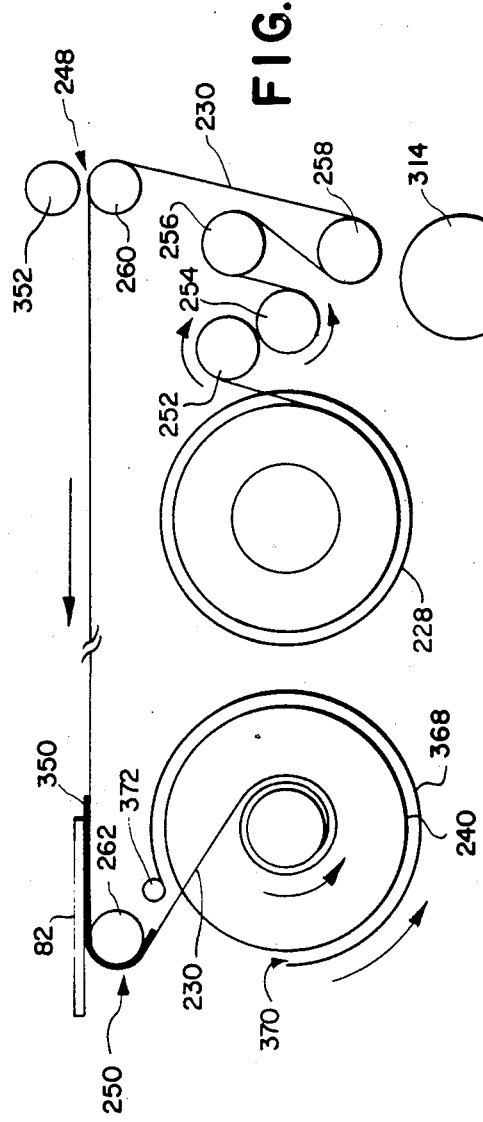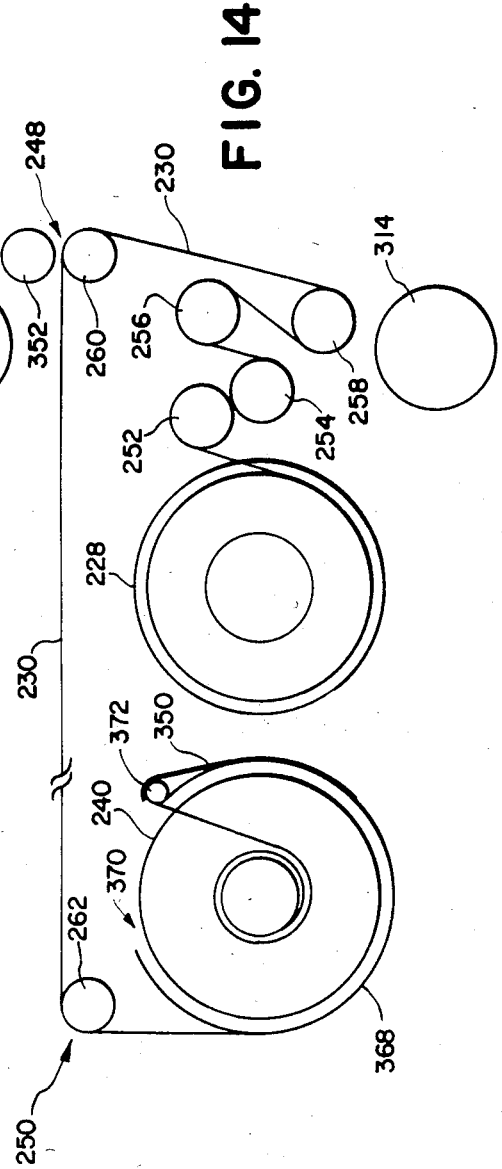

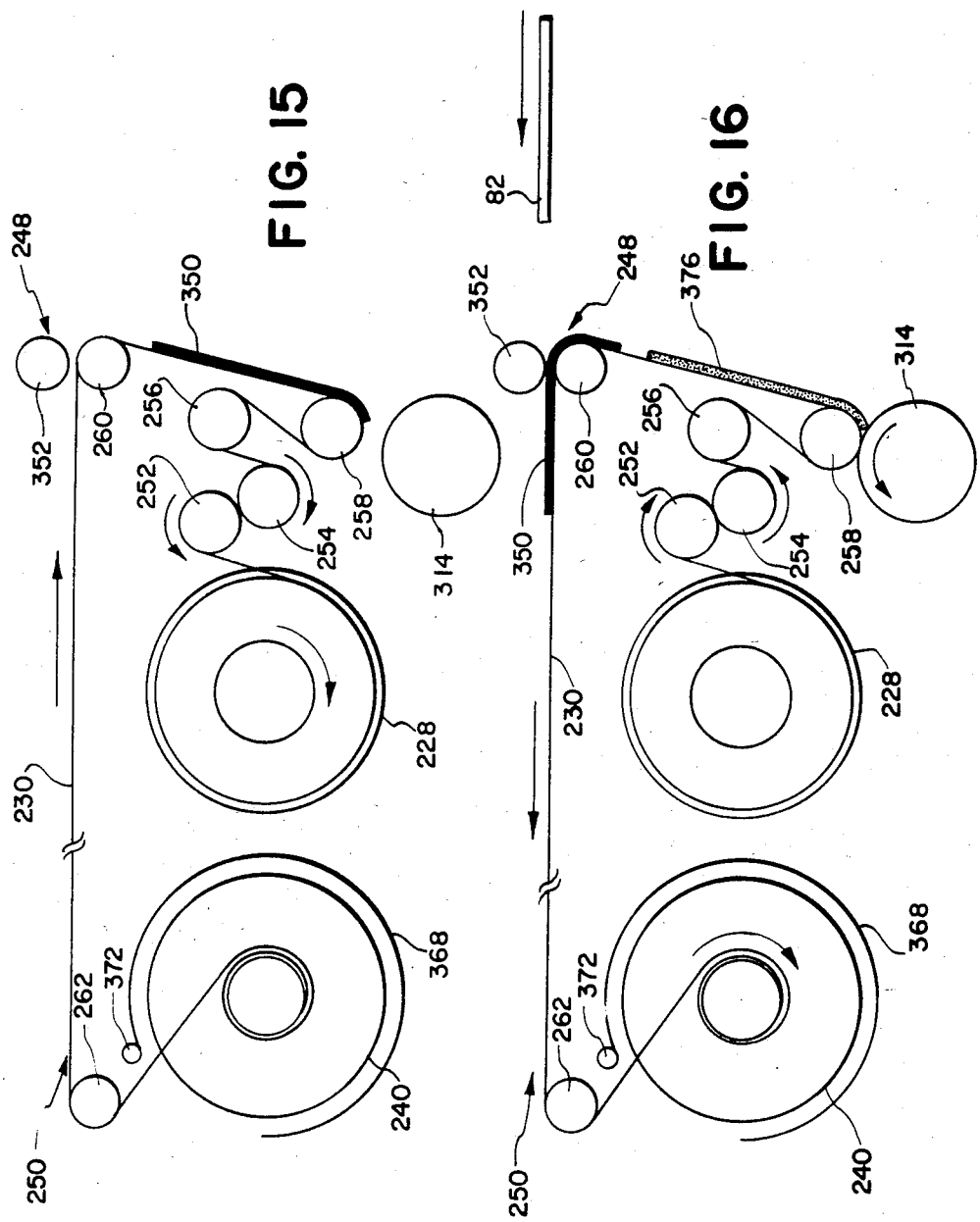

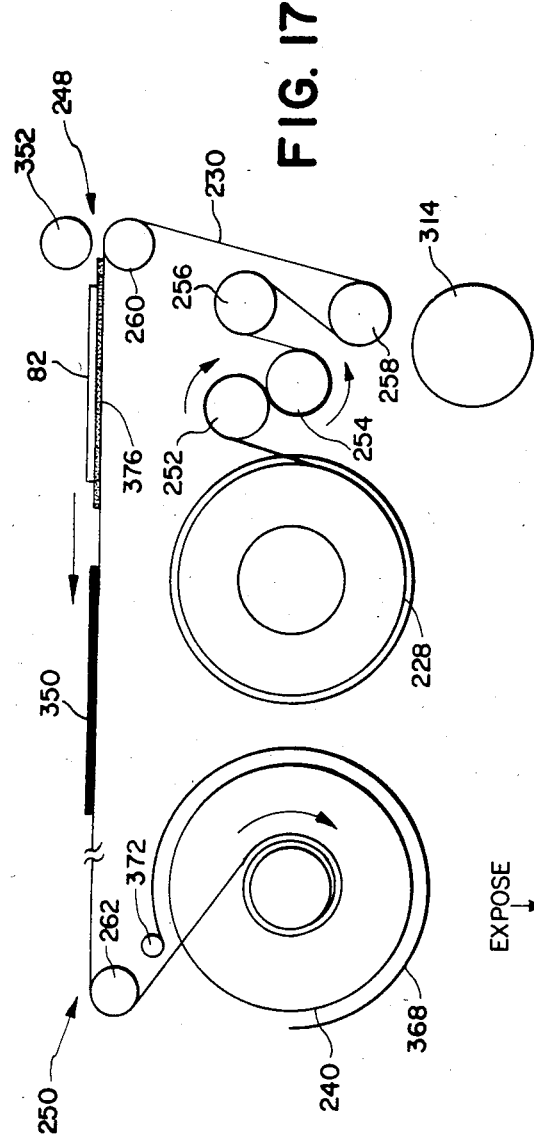
FIG. 17
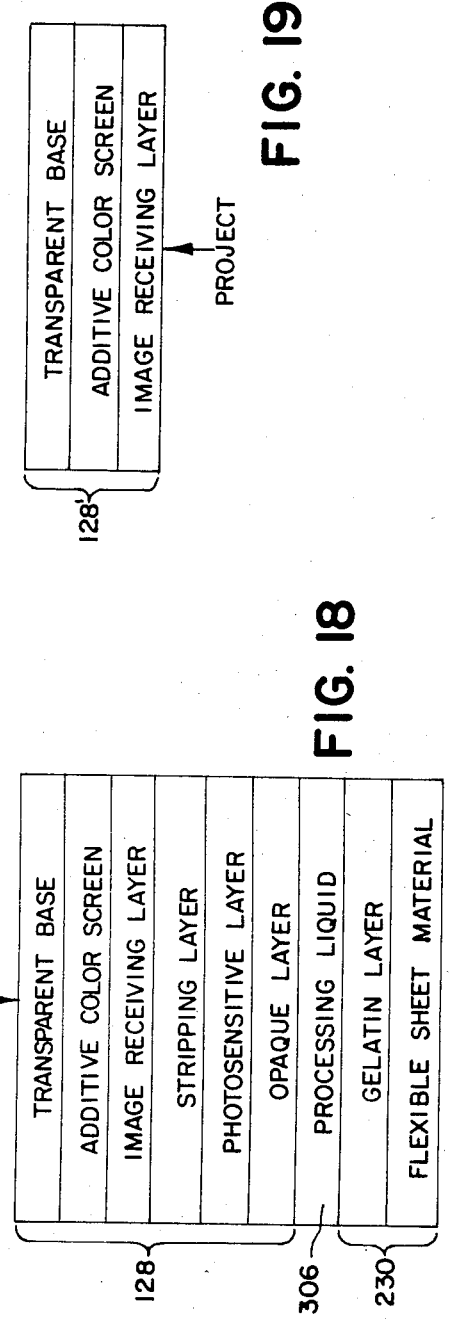
FIG. 19
FIG. 18

CAMERA BACK

RELATED APPLICATIONS

This application is related to the following applications, all of which are assigned in common and filed on instant date herewith: application Ser. No. 675,857, entitled "Photographic Film Assemblage", by Joseph H. Wright; application Ser. No. 675,856, entitled "Film Processor For Premounted Transparency Frames", by Donald J. Sulesky and Joseph H. Wright; application Ser. No. 675,853, entitled "Apparatus For Moving Coated Section of Sheet Material Into and Out Of Engagement With Film Frame", by Paul B. Mason and John B. Morse; application Ser. No. 675,858, entitled "Self Purging Processing Liquid Applicator", by John B. Morse and Joseph H. Wright; and application Ser. No. 675,651, entitled "Mount For Transparency Film Frame", by Frank M Czumak and Joseph H. Wright.

BACKGROUND OF THE INVENTION

1. Field of the Invention

The invention relates to apparatus, e.g., a camera back, for locating a film cassette in position for the sequential exposure of a plurality of premounted transparency frames of the instant type contained therein.

2. Description of the Prior Art

Apparatus for locating a film cassette in position for the sequential exposure of a plurality of premounted transparency frames of the instant or self-processing type contained therein are generally well known. Representative examples of such apparatus are shown and described in U.S. Pat. Nos. 4,172,647, 4,132,471, 4,114,166, 3,525,293, 3,369,470, and 3,225,671.

The apparatus disclosed in the '647 patent takes the form of a camera back which may be readily attached to a conventional camera of the 35 mm type. The camera back includes a chamber for locating a film cassette containing a stack of premounted transparency frames of the instant type in position for their sequential exposure. After the film units have been processed and removed from the camera back, a strippable opaque back is removed therefrom in preparation for the viewing of the transparency frames.

In the '471 patent, the apparatus takes the form of a self-developing type camera in which premounted "instant slides" are exposed, directed between a pair of processing rollers which rupture a container of processing liquid and spread its contents between specific layers of the film unit, and the film unit is then deposited in a lightight chamber until the latent image has been developed. Thereafter, the processed film unit may be removed from the chamber and an opaque backing sheet stripped therefrom prior to being placed in a projector.

In the '166 patent the apparatus also takes the form of a self-developing type camera wherein individual premounted transparency frames are moved from a film cassette into an exposure chamber wherein the frame is photographically exposed. After exposure, the frame is moved between a pair of processing rollers and then into a lighttight storage cassette where it remains until the latent image has been developed. Thereafter, the frame may be removed from the storage cassette and placed in a projector for viewing.

The apparatus of the '293 patent also takes the form of a camera of the self-developing type wherein individual premounted transparency frames are sequentially moved from a cassette into a exposure chamber. After the frame has been exposed, it is moved into a developing chamber where a roller ruptures a container of processing liquid and spreads its contents between layers of the film to initiate the formation of a visible image within the film unit. Thereafter, the processed film unit is removed from the camera, its garbage, e.g., pod, strip sheet and absorbent material, is stripped from the frame so that it is ready for viewing.

Finally, the '470 and '671 patents show self-developing type cameras for use with film assemblages of the type having a film cassette which houses a stack of premounted transparency frames of the instant type. The frames are adapted to be individually exposed, removed from their cassette and processed by spreading a processing liquid in a layer between elements of the transparency frame, and then removed from the camera. However, before they may be viewed, opaque backing sheets must be removed from the frames.

While the foregoing apparatus may perform their intended functions they still have deficiencies which detract from their usefulness. For example, they are not capable of storing one or more exposed film frames for later processing at a more compatible temperature while still permitting the continued exposure of the remaining film frames in the cassette. Further, the structure for supporting the film cassettes in position for the exposure of their respective film frames cannot be attached to a separate film processor for processing of the exposed film frames without exposing one of the film frames to the ambient light. Further, an operator of one of the above described apparatus is presented with a processed film frame which is either not in condition to be placed in a projector until various elements have been stripped or otherwise removed therefrom, or the processed frame is of the type wherein the image-recording and image-receiving layers are permanently laminated together thereby decreasing its transmittance ratio.

SUMMARY OF THE INVENTION

The instant invention relates to apparatus, e.g., a camera back, which contains a first chamber for locating a film cassette in position for the sequential exposure of a plurality of premounted transparency film frames of the instant or self-developing type. The apparatus includes a second chamber located adjacent to one side of the first chamber and a third chamber located on the opposite side of the first chamber. The third chamber includes a film advancing member comprising a coiled member having a width substantially equal to the width of the premounted frames. The second chamber is coupled to the side of the first chamber for movement to a loading position in which a film cassette containing a stack of premounted transparency film frames and a dark slide may be inserted into an open end of the first chamber. The film cassette contains an exposure opening in a top wall thereof, an egress in a leading end wall and an ingress in an opposite trailing end wall. A bottom wall of the film cassette includes a row of protuberances, which row extends in a direction perpendicular to the leading and trailing end walls. During loading of the film cassette into the first chamber trailing end first, an end of the film advancing member is located within the first chamber in position to enter the ingress in the cassette's trailing end wall as the film cassette moves relative to said end. As the film advancing member's end enters the ingress it engages a trailing edge of the dark slide and progressively moves it to the exterior of the film cassette via the egress as the movement of the film cassette into the film chamber continues. Thus, the dark slide is automatically removed from the film cassette during its loading. Also, during such loading the row of protuberances on the bottom wall cooperates with a pivotally mounted pawl in the first chamber such that the protuberances ride over the pawl during insertion of film cassette, but will be latched by the pawl should one try to remove a partially or fully inserted film cassette, thereby preventing premature exposure of the uppermost film frame in the stack. A knob on the exterior of the apparatus is provided for moving the pawl to an inoperative position wherein the film cassette may be removed from the first or film chamber.

After the film cassette has been loaded, the second chamber is moved into a position so as to close the open end of the first chamber. The film advancing member is then actuated in a direction so as to remove an end portion thereof from a first position wherein it is in light sealing relation to an endmost premounted transparency film frame in the stack, to a second position in which the film frame is biased into an exposure position, i.e., the position previously occupied by the dark slide. After the transparency film frame has been photographically exposed, the film advancing member is actuated in a direction so as to cause its end to engage the trailing edge of the endmost transparency film frame and advance it from the film cassette to a position within the second chamber wherein it may remain until it is to be processed. After one or more of the film frames have been exposed and moved into the second chamber, the photographer may wish to process the exposed film frames before exposing any of the remaining film frames in the cassette. In such a case, the film advancing member's end portion is allowed to remain in its first position, i.e., in lighttight relation to the endmost film frame in the stack, after having moved the last exposed film frame into the second chamber. The apparatus may then be placed within a film processor where suitable means may be provided for moving the end portion of the film advancing member from the first position to a third position and back to the second position. During the movement of the end portion toward the third position it engages a trailing edge of an exposed premounted film frame and moves it from the second chamber via an exit slot therein to a position wherein it is adapted to be laminated to a length of flexible sheet material, e.g., Mylar, having a coating of gelatin thereon which has just had a layer of processing liquid applied thereto. The resulting laminate is then moved toward a stripping station as the processing liquid is allowed to imbibe the exposed transparency film frame. After a predetermined period of time, e.g., one or two minutes, a visible image forms in the film frame. The sheet material is then stripped from the film frame while the latter is directed to a station whereat it may be retrieved by the user and immediately placed in a projector for viewing. During the stripping operation, the emulsion or photosensitive layer of the film unit exhibits a greater adhesion to the flexible sheet material than to the next adjacent layer, whereby removal or stripping of the sheet material removes the emulsion layer as well as a rear opaque layer thus increasing visual acuity and brightness of the resultant positive transparency and enhancing its stability by virtue of the removal of residual processing reagent in the photosensitive layer. After the exposed premounted film frames have been processed, the apparatus may be removed from the camera and the exposure of the remaining film frames commenced.

An object of the invention is to provide an apparatus for locating a film cassette containing a stack of premounted instant type transparency film frames in position for their sequential exposure with a chamber for holding the frames subsequent to their photographic exposure until such time as the photographer deems it desirable to initiate their development.

Another object of the invention is to provide an apparatus of the type described with film advancing means which can function as a dark slide for protecting unexposed transparency film frames from ambient light.

Still another object of the invention is to provide apparatus for locating a film cassette containing a stack of film units and a dark slide in position for the sequential exposure of the film units with means for automatically ejecting the dark slide during the loading of the film cassette into the apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a side elevational view, partly in cross section, showing apparatus in the form of a camera back for locating a film cassette in position for the sequential photographic exposure of a stack of premounted transparency film frames of the instant or self-developing type;

FIG. 2 is an end elevational view in cross section of the apparatus shown in FIG. 1 taken generally along the line 2—2 in FIG. 1;

FIG. 6 is an exploded perspective view of a photographic film assemblage;

FIG. 7 is a bottom elevational view of the film cassette shown in FIG. 6;

FIG. 8 is a bottom elevational view of one of the premounted transparency film frames shown in FIG. 6;

FIG. 8a is a plan view of a plate which may be used with the frame of FIG. 8;

FIGS. 9-17, inclusive, schematically represent the relationship between various elements of the processor and an exposed premounted transparency film frame during its processing;

FIG. 18 is a schematic cross sectional representation of a film unit which comprises an element of a premounted transparency film frame, and its relationship with a flexible sheet material during the formation of a visible image within the film; and FIG. 19 is a view similar to FIG. 18 showing the layers of the film unit after the flexible sheet material has been stripped therefrom.

DETAILED DESCRIPTION OF THE INVENTION

Figure 3:
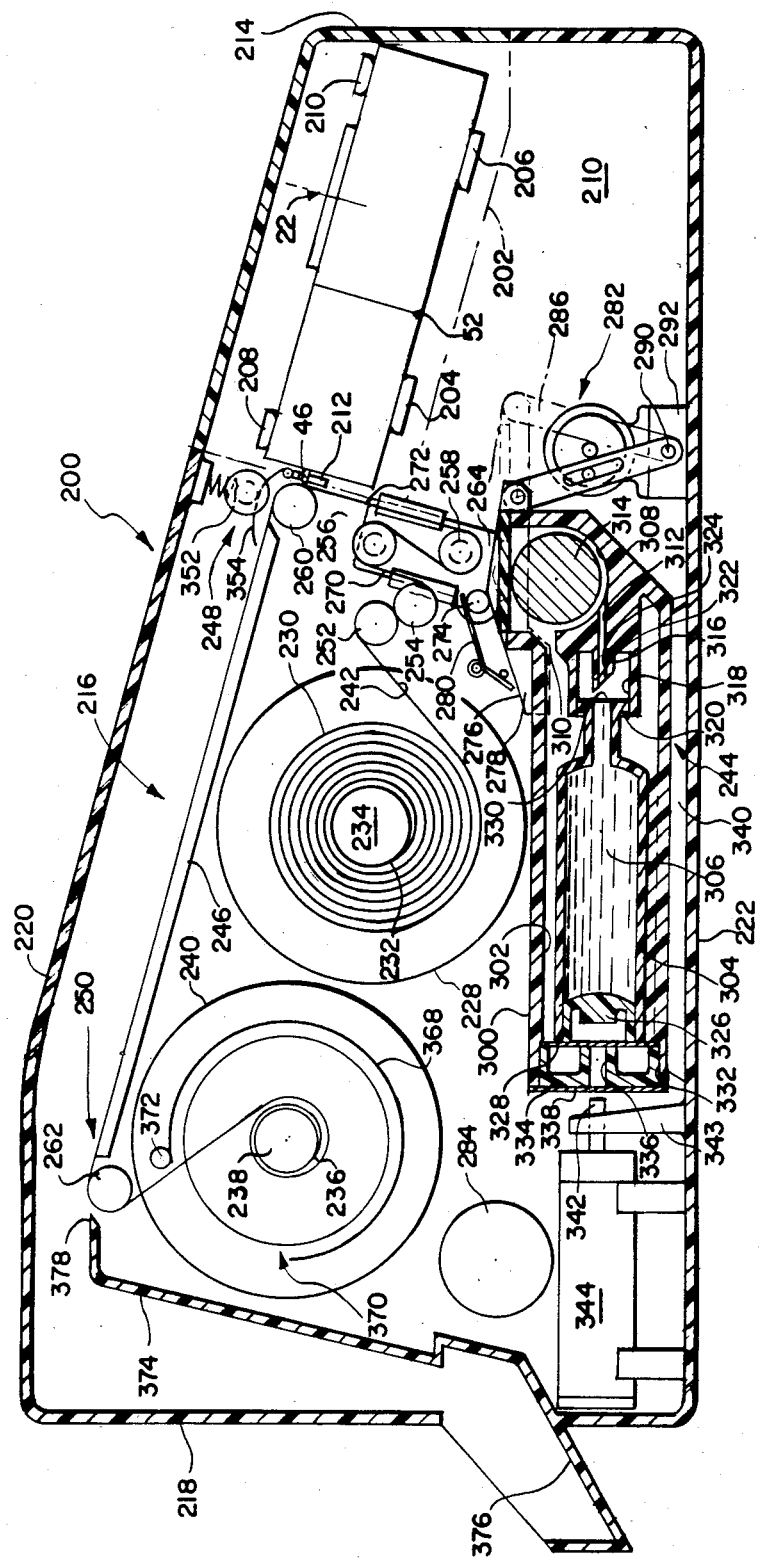
FIG. 3 is a side elevational view, partly in cross section, of a processor for premounted transparency film frames.

Reference is now made to the drawings, and in particular to FIGS. 1 and 2, wherein is shown an apparatus in the form of a camera back 10 which is adapted to be readily attached to a main body of a conventional camera, preferably of the 35 mm type, by any suitable means, not shown. The camera back 10 is generally parallelpiped in configuration and includes a housing 12 having first, second, and third chambers 14, 16 and 18, respectively. The first chamber 14 includes a wall 20 having an opening 22 therein through which image bearing light may pass, and an opposite wall 24 having a recess 26 in which a pawl 28 is pivotally mounted. The first chamber further includes an open end 30 which faces and is closely adjacent to a wall 32 of the second chamber 16. As will be more fully described later, the open end 30 is adapted to receive a photographic assemblage during its loading into the first chamber 14.

The second chamber 16 includes, in addition to the wall 32, top and bottom walls 34 and 36, respectively, and an end wall 38. The walls 32 and 38 extend upwardly from the bottom wall 36 and terminate before they reach the top wall 34 thus defining therewith a first transversely extending slot 40, which provides communication between the first and second chambers 14 and 16, and a second transversely extending slot 42 which provides communication between the second chamber 16 and the exterior of the camera back 10. The wall 38 also has a vertically extending slot 44 therein through which a portion 46 of a light seal 48 protrudes. The light seal 48 is resiliently biased into the solid line position (by means not shown) wherein it prevents any light from entering the second chamber 16 via the slots 42 and 44. Mounted within the second chamber is a spring biased platen 50. The platen 50 normally occupies a position just below a plane containing the slots 40 and 42 where its further upward movement in the second chamber is prevented by suitable stops. The second chamber 16 is coupled to the first chamber 14 by a hinge 52 for movement between the position, shown in FIG. 1 wherein it substantially closes off the open end 30 of the first chamber 14, and a loading position wherein a film assemblage may be loaded into the first chamber 14.

The third chamber 18 includes top and bottom walls 54 and 56 which are interconnected by a pair of side walls 58 and 60. The third chamber also includes a wall 62 which extends upwardly from the bottom wall 56 and terminates short of the top wall 54 so as to define therewith a laterally extending slot or opening 64 which provides communication between the first and third chambers 14 and 18. Mounted between the walls 58 and 60 is a means for advancing premounted transparency frames from the first chamber 14 to the second chamber 16 and from the latter chamber to the exterior of the camera back 10. Specifically, the advancing means comprises a sheet of resilient opaque material 66 which is coiled about a roller 68 whose journals 70 and 72 are rotatably supported by the walls 58 and 60. The resilient material 66 has one end (not shown) secured to the roller 68 and an opposite end 74 which is adapted to engage a trailing edge of a premounted transparency film frame. The film advancing means 66 has a width greater then the width of the opening 22 in the first chamber 14, and of the width of a premounted transparency film frame. The film advancing means 66 also has a stiffness sufficient to prevent its buckling when being used to advance a premounted film frame. A knob 76 is fixedly attached to a portion of the journal 70 located exteriorly of the third chamber 18 for rotating the roller 68.

The first chamber 14 is adapted to receive a photographic film assemblage of the type shown in FIG. 6. The film assemblage includes an opaque film cassette 80, preferably molded from styrene, a plurality of premounted transparency film frames 82, preferably of the 35 mm instant type, a dark slide 84, a platen 86 and a spring 88.

The film cassette 80 comprises a generally rectangularly shaped housing defined by spaced leading and trailing end walls 90 and 92, respectively, a pair of side walls 94 and 96, a bottom wall 98 and a top wall 100 having an exposure aperture 102 therein. The trailing end of the film advancing member may pass into the interior of the film cassette 80. The leading end wall 90 has a correspondingly shaped egress 106 through which the premounted transparency film frames may be advanced, one at a time, into the second chamber 16. The bottom wall 98 of the film cassette includes a circular recess 108 for receiving and supporting one end of the spring 88. The bottom wall 98 also includes a pair of vertical flanges 110 and 111 which extend around the periphery of the bottom wall 98. The flanges 110 and 111 are adapted to telescopically receive therebetween a recessed area 112 which extends along the bottom of the walls 90, 92, 94 and 96, thus establishing a labyrinth-type connection. The bottom wall 98 is maintained in engagement with the main body of the film cassette 80 by a plurality of resilient latches 114 which are integrally formed in the flange 110 and which are adapted to snap into the lower portions 116 of a pair of vertical recesses 118 and 120 located in each of the walls 90 and 92. The top portions of the inwardly protruding recesses 118 and 120 and the interior surfaces of their respective walls 90 and 92 merge into a generally planar surface so as to provide, with a skirt on the dark slide 84, a light seal, as will be further explained later. The flange 110 also includes an opening 122 which is adapted to receive a correspondingly shaped member (not shown) located on the interior surface of the bottom wall 24 of the first chamber to insure that the film cassette 80 can only be loaded into the first chamber 14 in one orientation. Finally, as best seen in FIGS. 1 and 7, the exterior surface of the bottom wall 98 is provided with a plurality of serrations 124 which are aligned in the direction of movement of the film cassette 80 into the first chamber 14.

Each of the premounted transparency film frames 82 includes a mount 126 to which a film frame 128 is laminated. The mount 126 includes an opening 130 which extends between a front surface 132 and a rear surface 134 thereof. The mount 126 also includes a leading end 136 which is tapered at its ends 137 and 139 from the front surface 132 to the rear surface 134 and a trailing end 138 which is tapered across its entire length at 141 in an opposite direction, i.e., from the rear surface 134 to the front surface 132. The leading end 136 is provided with a pair of slots 140 and 142 while the trailing end 138 is provided with a similar pair of slots 144 and 146. At the closed end of each of the slots 140 and 142 is a ramped surface 148 and 150, respectively, which extends in a right hand direction, as viewed in FIG. 8, from the front surface 132 to the rear surface 134. The closed ends of the slots 144 and 146 are also provided with similar ramped surfaces 152 and 154, respectively. The rear surface 134 includes a centrally located low-level rectangularly shaped surface 156 and 158, with the surface 158 being located in a plane intermediate that containing the surface 156 and that containing the rear surface 134. The aforementioned film frame 128, which is generally of the same area as that of the surface 158, is laminated to the surface 158 and is not shown in FIG. 8 for reasons of clarity. The rear surface of the film frames 128 is provided with an opaque layer to prevent the exposure or fogging of underlying film frames during the exposure of the uppermost film frame in the stack.

The stack of premounted transparency film frames and the dark slide 84 are supported by the platen 86. One major surface 158 of the platen is provided with a pair of laterally spaced and longitudinally extending rails 160 and 162 which function to space the opaque layer of the rearwardmost film frame 128 in the stack from the surface 158, thus preventing scratching of the underlying emulsion layer during the advancement of the film frame from the cassette 80. A second major surface 164 of the platen 86 includes a cylindrically shaped member 166 for receiving an end of the coil spring 88.

When the photographic film assemblage shown in FIG. 6 is assembled, the dark slide 84 is located between the wall 100 and the uppermost premounted transparency film frame 82 in the stack. Further, an opaque sheet of material 168 attached to the dark slide 84 has opposite depending ends 170 and 172 which are adapted to be pressed into engagement with the top, generally planar, interior surface of each of the walls 90 and 92 by the leading and trailing ends of the uppermost premounted transparency film frame 82 to prevent the passage of light through the egress 106 and the ingress 104, respectively.

As previously described, the film cassette 80 is adapted to be inserted into the first chamber 14 trailing end wall 92 first. During such insertion, the end 74 of the film advancing means 66 is located in its first position wherein its end 74 is located in alignment with the ingress 104 and across the opening 22 in the first chamber 14. The relative movement of the film cassette 80 and the end 74 results in the latter entering the ingress 104 and engaging the trailing end of the dark slide 84. Continued movement of the film cassette 80 results in a corresponding movement of the dark slide 84 from the film cassette 80 via the egress 106 thus progressively uncovering the uppermost premounted transparency film frame 82 in the stack. However, as this premounted film frame 82 is being uncovered by the movement of the dark slide 84, it is being simultaneously covered in lighttight relation by the end 74 as the former slides under the latter. Also, during such insertion of the film cassette 80, the serrations 124 on the bottom wall 98 of the film cassette 80 keep camming the pawl 28 downwardly as they pass thereover. As best seen in FIG. 1, withdrawal of the film cassette 80 from the first chamber 14 is prevented by the pawl 28 engaging a vertical section of one of the serrations 124. To remove a partially or fully inserted film cassette 80, the operator must intentionally rotate a knob 174 mounted on the side of the camera back so as to lower the pawl 28 to a position wherein it is out of interference with the serrations 124.

After the film cassette 80 has been fully inserted into the first chamber 14, the second chamber is rotated into the position shown in FIG. 1 wherein it is suitably latched by means not shown. The camera back 10 may now be attached to the main body of a camera and the knob 76 rotated in a direction so as to move the end 74 of the film advancing means 66 to a second position wherein the edge of the end 74 is in the slot 64 and the end 74 is out of covering relation to the uppermost premounted transparency film frame 82 in the stack. Thus removed, the spring 88 and platen 86 resiliently urge the stack upwardly until the uppermost premounted transparency film frame 82 is located in engagement with the top wall 100 and thus in position for exposure to the camera's lens. After the film frame 128 has been exposed, the knob 76 is rotated in a direction so as to cause the end 74 of the film advancing means 66 to move from its second position to its first position. During such movement, the end 74 engages the trailing end 138 of the exposed premounted transparency film frame 82 and moves it from the film cassette 80 via the egress 106 and into the second chamber 16 via the slot 40 where it is supported by the spring biased platen 50. To expose the next film frame the procedure is repeated, i.e., the end 74 is returned to its second position, the film frame 128 exposed, and the end 74 returned to its first position thus depositing the second premounted transparency film frame 82 in the second chamber 16 on top of the first premounted transparency film frame. During the passage of the second premounted film frame 82 into the second chamber 16, its tapered ends 137 and 139 cooperate with the tapered trailing edge 141 of the first premounted transparency film frame so as to cause the former to move to position on top of the latter.

Figure 4:
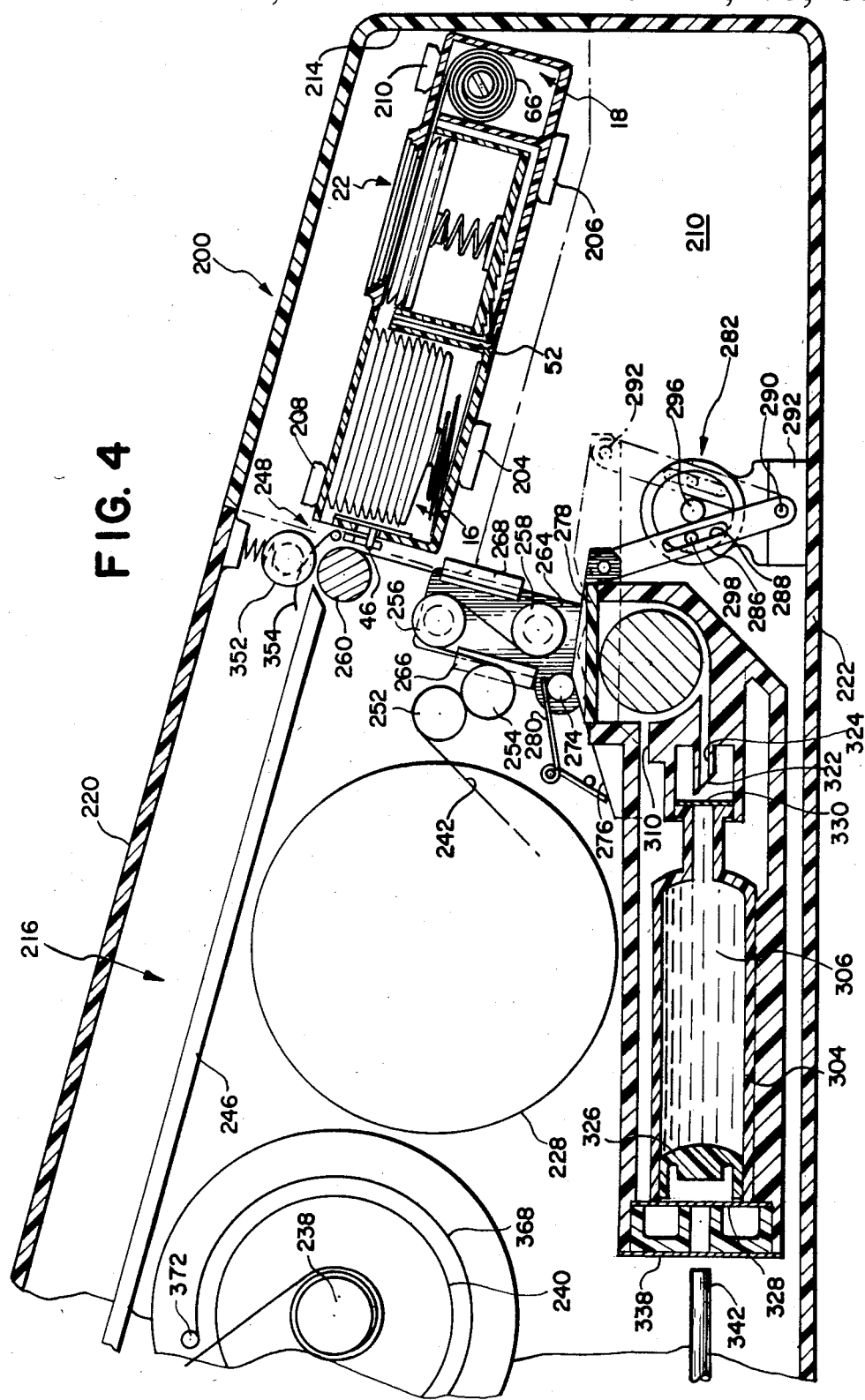
FIG. 4 is an enlarged side elevational view, partly in cross section, showing a portion of the processor shown in FIG. 3.

After one or more, but less than all, of the premounted transparency film frames 82 have been exposed, the photographer may wish to process one or more of the exposed ones before exposing the remaining frames. In such a case, the camera back 10 is detached from the main body of the camera while the end 74 of the film advancing means 66 is in the first position in lighttight relation to the next film frame to be exposed. The camera back 10 is then placed in a film processor 200. For example, as shown in FIGS. 3 and 4, the camera back 12 may be inserted into the processor by way of a side door 202 such that it is received between and is supported by members 204, 206, 208, and 210 which extend inwardly from a side wall 210 of the processor 200. During such insertion, the portion 46 of the light seal 48 engages an inclined surface 212 of a camming member mounted within the processor thereby moving the portion 46 and associated light shield downwardly thus opening the slot 42 in the camera back's second chamber 16. Alternatively, the camera back 10 could be inserted through a door located in an end wall 214 of the processor 200. In either case, the movement of the light seal 48 to the open position takes place at a location within the processor where the ambient light is not actinic to the exposed film frames in the second chamber 16.

The processor 200 includes a generally light-tight chamber 216 defined a pair of end walls 214 and 218, top and bottom walls 220, 222, and a pair of side walls 210 and 226. Mounted within the chamber 216 is a supply reel 228 having a length of flexible sheet material 230 wound thereupon with one end 232 secured to a hub 234 of the supply reel 228 and its opposite end 236 secured to a hub 238 of a take-up reel 240. The sheet material is preferably Mylar having a coating of gelatin on one side 242 thereof. Mounted below the supply reel 228 is a processing liquid applicator 244 of the disposable type while a support 246 having a width substantially equal to that of the flexible sheet material 230 extends above the supply and take-up reels 228 and 240. A laminating station 248 is located at one end of the support 246 and a stripping station 250 is located at the opposite end of the support 246.

The processor 200 further includes means for guiding the movement of the sheet material 230 from the supply reel 228 to the take-up reel. Specifically, these means includes a pair of superposed power rollers 252 and 254 between which the sheet material 230 passes, a pair of idler rollers 256 and 258 which guide the sheet material 230 toward the processing liquid applicator 244, and rollers 260 and 262 located at the laminating and stripping stations 248 and 250, respectively.

The opposite ends of the rollers 256 and 258 are rotatably mounted between a pair of plates 265 (only one being shown) so as to fixedly locate the longitudinal axes of the rollers 256 and 258 relative to each other. Opposite edges of each plate 264 are located within guides 266 and 268, having U-shaped cross sectional configurations, for simultaneous movement of the plates 264 and thus the rollers 256, and 258 between a first position (see FIG. 5) and a second position (see FIG. 3). At this point it should be noted that the sheet material 230 travels along a generally linear path 270 as it leaves the roller 254 and approaches the rollers 256, and it travels along a generally linear path 272 as it leaves the roller 258 and moves toward roller 260, which path is substantially parallel to the path 270. Also, as the rollers 256 and 258 and the plates 264 are simultaneously moved between said first and second positions, the longitudinal axes of the rollers 256 and 258 travel in planes which are parallel to the paths 270 and 272. Thus as the rollers 256 and 258 are moving toward their second position (FIG. 5 position) the path 270 gets shorter by exactly the same amount that path 272 gets longer. Accordingly, the speed of the sheet material 230, as it moves from the supply reel 228 to the take-up reel 240 remains substantially constant as the rollers 256 and 258 move between their first and second positions. The plates 264 each include an inwardly extending cam follower 274 which is maintained in engagement with a cam 276 formed on a cover 278 of the processing liquid applicator 244 by a spring 280. Thus, when the cover 278 is moved between its open position (FIG. 5) and its closed position (FIG. 4), the cams 276 on laterally opposite sides of the cover 278 move the plates 264 into their second position against the bias of the spring 280 by virtue of their engagement with the cam followers 274. Movement of the cover 278 between its closed and open positions is accomplished by an eccentric drive mechanism 282 which is powered by a motor 284. The drive mechanism 282 includes a link 286 having a slot 288 therein. One end of the link 286 is pivotally coupled at 290 to a base 292 while its other end is pivotally coupled to an end of the cover 278 by a pin-slot arrangement 292. The apparatus 282 further includes a drive disk 294 which is mounted for rotation about an axis 296. The disk 294 has a pin 298 extending outwardly therefrom which is adapted to ride in the slot 288. Thus, rotation of the disk 294 is transferred to reciprocating movement of the cover 278.

The processing liquid applicator 244 contains more than sufficient processing liquid to coat the entire length of the sheet material 230 and is adapted to be disposed of upon the depletion of the processing liquid. The applicator 244 includes a housing 300 having a chamber 302 for receiving a container 304 having a supply of processing liquid 306 therein. The housing 300 also includes a reservoir 308 which is adapted to hold a quantity of the processing liquid 306. The reservoir 308 includes an egress 310 through which processing liquid 306 may flow into the chamber 302 and an ingress 312 which is located at a level below that of the egress 310. A cylindrically shaped member such as a drum or roller 314 is rotatably supported within the reservoir 308 with its peripheral surface adapted to be partially submersed within the processing liquid 306. Located between the chamber 302 and the reservoir 308 is a connector 316 having a cylindrically shaped recess 318 which is adapted to slidably receive a correspondingly shaped end 320 of the container 304. Formed within the recess 318 is a puncturing member 322 having a passageway 324 therein which communicates with the ingress 312.

Slidably mounted within one end of the container 304 is a pressure-applying means in the form of an E-shaped plug 326. The same end of the container 304 is sealed by a rupturable disc 328 while the opposite end 320 is sealed by a rupturable disc 330. An open end 332 of the chamber 302 is closed by a plug 334 having a passageway 336 therein. The passageway 336 is sealed by a third rupturable member 338. Thus, with the cover 278 in its closed position, as shown in FIG. 3, wherein it substantially seals the reservoir 308, the liquid applicator 244 is substantially sealed off from the ambient atmosphere and is in condition to be shipped to a customer. Also, since the processing liquid 306 is of a type which degrades in the presence of oxygen, a quantity of nitrogen gas may be sprayed into the chamber 302 prior to sealing the chamber 302 to combat the adverse effects of any oxygen which subsequently might leak into the chamber 302.

The processing liquid container 244 is adapted to be releasably secured to a platform 340 located in the bottom of the chamber 216 with the passageway 336 in the plug being located in alignment with a threaded shaft 342 which extends outwardly from a motor 344, and through a stanchion 343 having a correspondingly threaded bore therein, with the end of the cover 278 attached to the link 286, and with the applicator roller 314 being connected to a drive shaft located in the processor 200.

Figure 5:
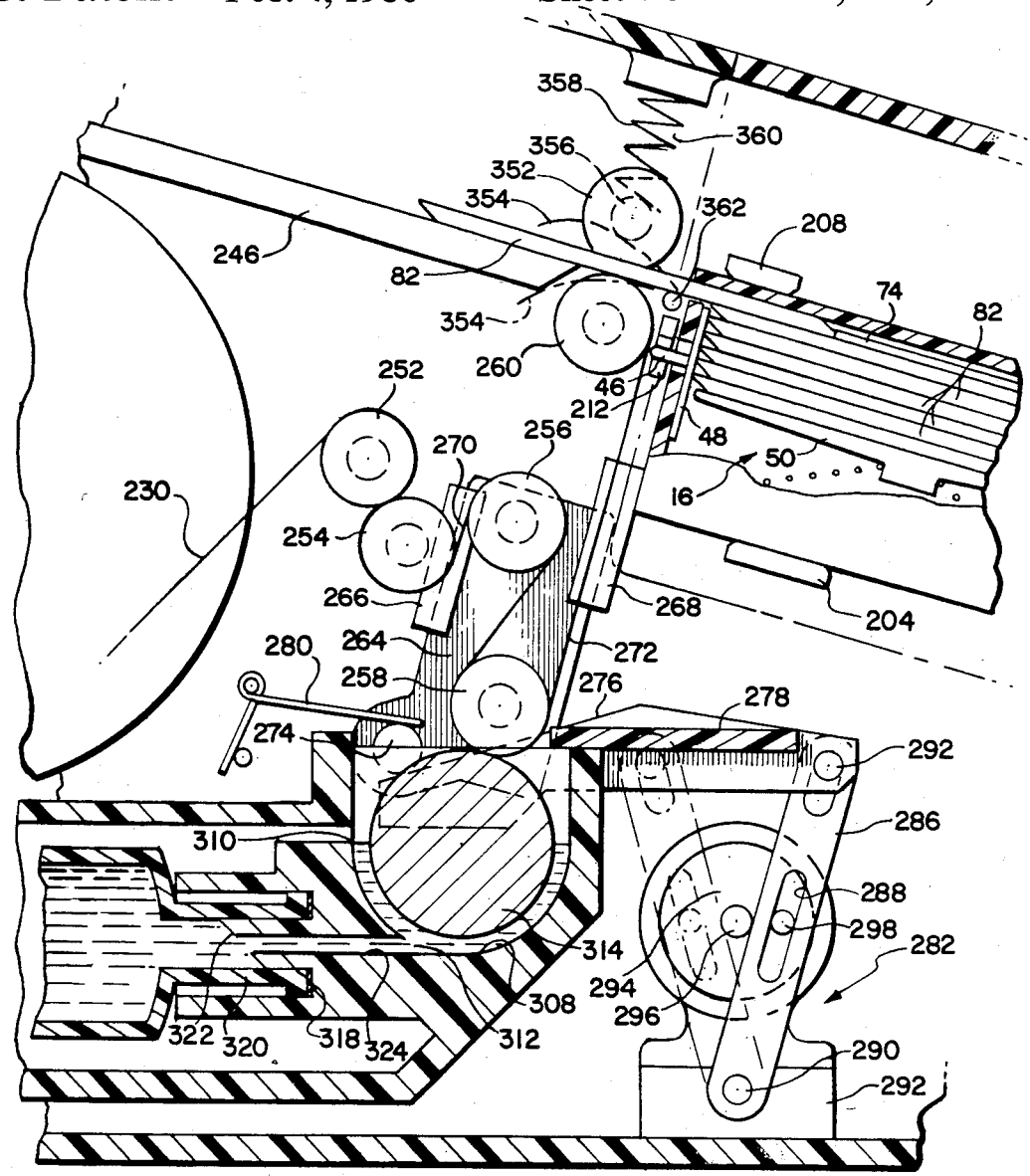
FIG. 5 is an enlarged side elevational view, partly in cross section, of a portion of the processor shown in FIG. 4.
Figures 9, 10:
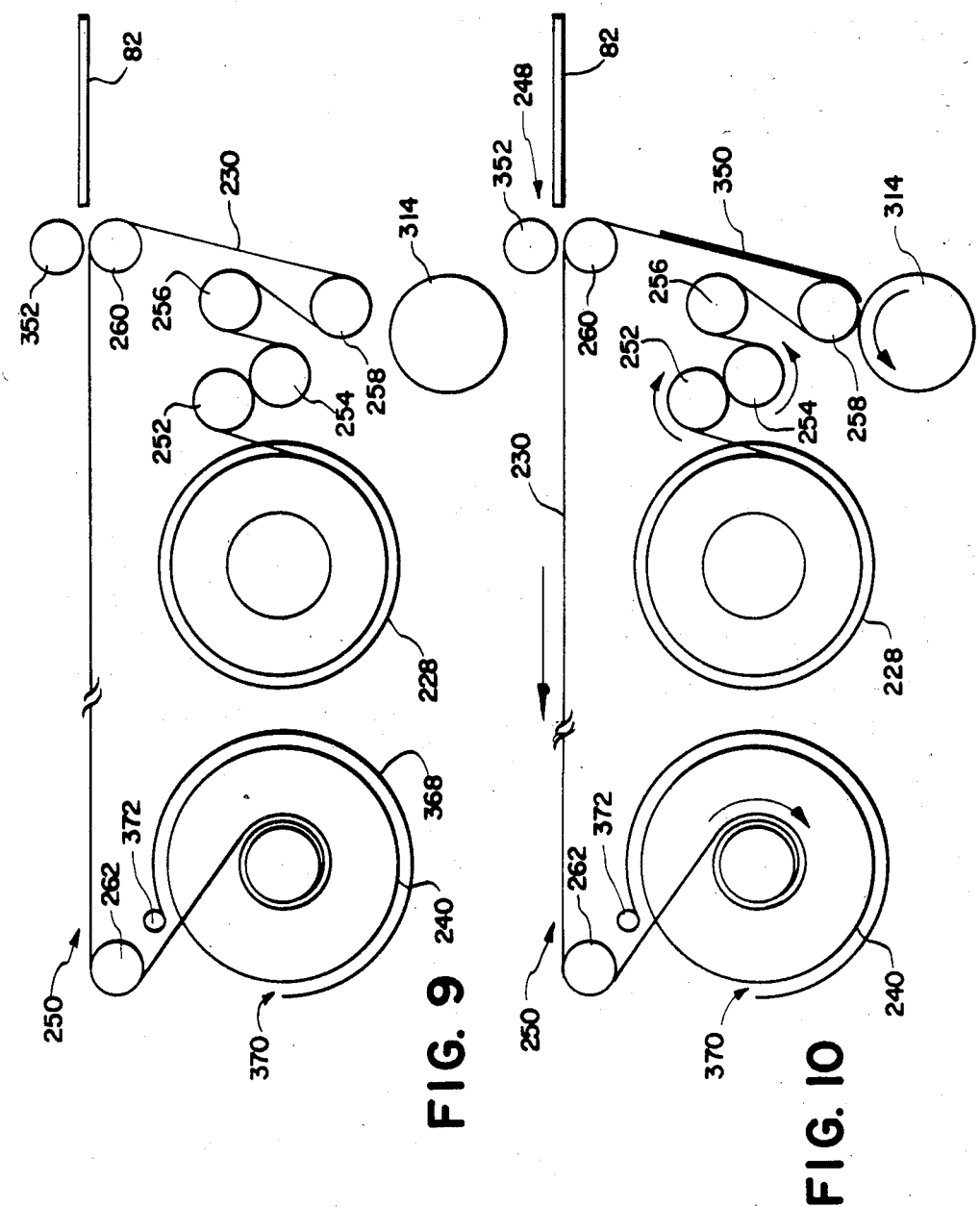

When it is desired to process one or more of the exposed premounted transparency film frames 82 located in the second chamber 16 of the camera back 10, the motor 344 is actuated so as to progressively drive the shaft 342 to the right, as viewed in FIGS. 3 and 4, until it engages and ruptures the member 338. The rightward movement of the shaft 342 advances it through the passageway 336 in the plug 334 until it engages the member 328. The resistance of the member 328 to rupturing is such that the rightward movement of the shaft 342 drives the entire container 304 from a first position, as shown in FIGS. 3 and 4, wherein the end 320 of the container 304 is still sealed, to a second position, as shown in FIG. 5, wherein the sealing member 318 is impaled upon the hollow puncturing member 322. Continued rightward movement of the shaft 342 is now effective to drive the plug 326 from its first position, adjacent to the left hand side of the container, to a second position, near the end 320 of the container 304. As the plug 326 is moved towards its second position, processing liquid 306 is driven from the container 304 into the reservoir 308 via the passageway 324 and the ingress 312 until the level of the processing liquid 306 in the reservoir reaches the level of the egress 310. At the point the motor 344 is deenergized so as to maintain the shaft 342 and thus the plug 326 at an intermediate position within the container 304. At this time in the processing cycle, the relationship between various elements of the processor is as depicted in FIG. 9. Next, the motor 284 is energized to drive the eccentric drive mechanism 282 such that the disc 294 is rotated through 180° thereby moving the cover 278 of the processing liquid applicator 244 to its open position, as shown in broken lines in FIGS. 3 and 4, and in solid lines in FIG. 5. Simultaneously therewith, the liquid applicator roller 314 is rotated in a counterclockwise direction, the take-up reel 240 is driven in a clockwise direction, and the power rollers 252 and 254 in directions which remove the sheet material 230 from the supply reel 228. As the cover 278 moves into its open coating position, each of the two springs 280 (only one shown) forces its associated cam follower 274 to follow the underlying cam surface 276 on the cover 278 thereby moving the mounting plates 265 and the rollers 256 and 258 from a second position, in which the roller 258 and sheet material 230 are out of coating relation with the processing liquid roller 314, to a first position (see FIG. 5), wherein the roller 258 holds the sheet material in coating relation to the applicator roller 314. During this time, the power rollers 252 and 254 are withdrawing the sheet material 230 from the supply reel 228 at a fixed rate while the take-up reel 240 is being rotated at a speed which would advance the sheet material 230 at a greater rate. However, the drive to the take-up reel 240 is clutched so that it will not cause the sheet material 230 to be advanced at a rate greater than said fixed rate. Accordingly, any slack which may tend to appear in the sheet material 230 between the power rollers 252 and 254 and the take-up reel 240 is immediately removed. During the passage of the sheet material 230 between the bite of the rollers 258 and 314, the latter applies a coating of the processing liquid 306 to a fixed length 350 of the gelatin coated side 242 thereof, said fixed length 250 being slightly greater than the corresponding length of one of the premounted transparency film frames 82. The relationship between various elements of the processor 200 is now as shown in FIG. 10 with the direction of rotation of the driven elements being indicated by the curved arrows and the direction of movement of the sheet material 230 by the horizontal arrow. After this fixed length 350 has been coated, eccentric drive mechanism 282 is again energized to drive the disc 294 through another 180°, thus returning the cover 278 to its closed position. The movement of the cover 278 towards the closed position shown in solid lines in FIGS. 3 and 4 is effective to move the support plates 264 and associated rollers 256 and 258 from their first position (FIG. 5) to their second position (FIGS. 3 and 4) wherein the flexible sheet material is out of coating relation with the applicator roller 314.

Figure 11:
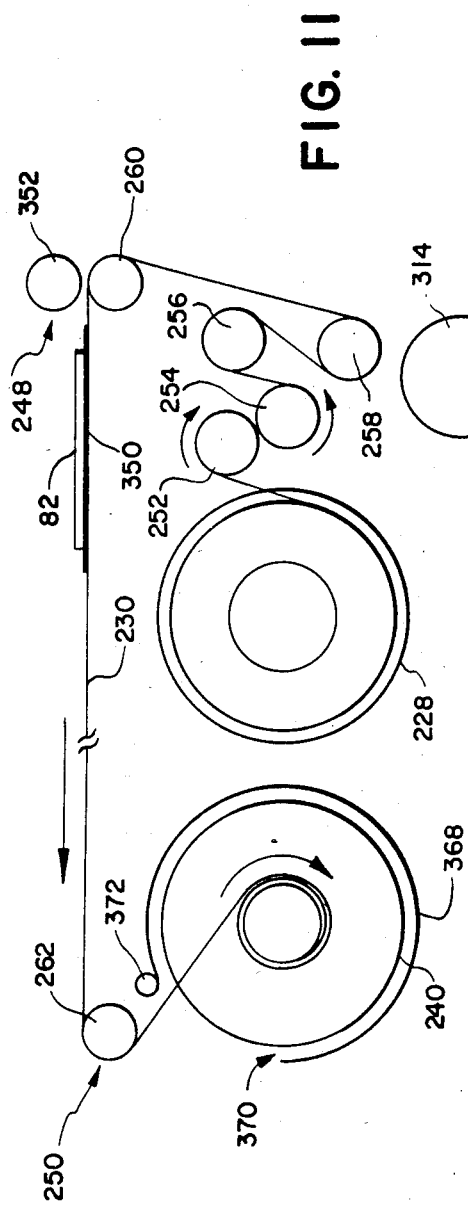
Figure 12:
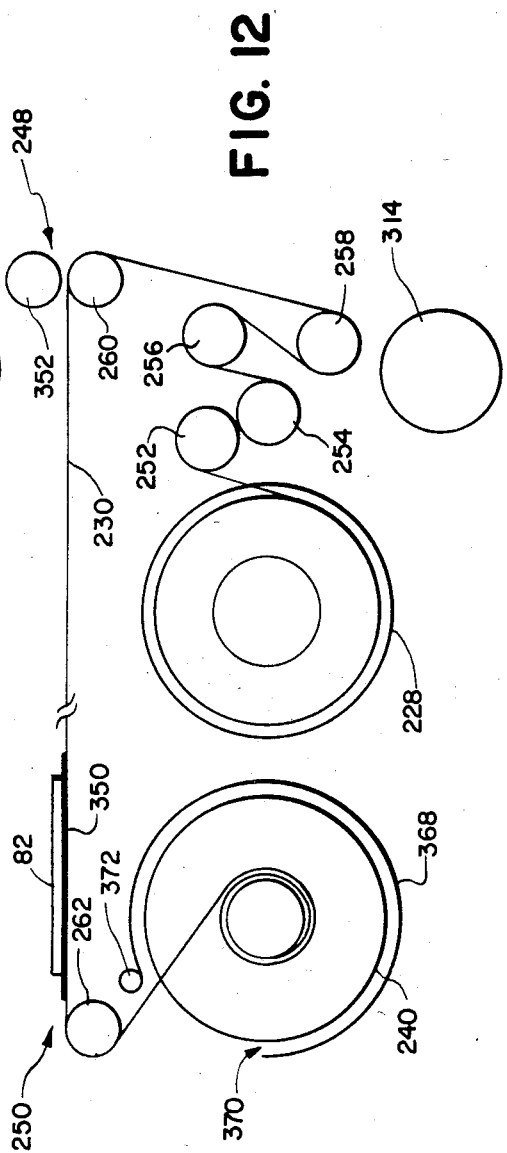

As the length 350 of the sheet material 230 moves into the laminating station 248, it is superposed with the film frame 128 and moved into the bit between the roller 260 and a roller 352. The peripheral surface of the roller 352 is originally spaced from the corresponding surface of the roller 260 so as to facilitate the introduction of the leading end 136 of the premounted transparency film frame 82 therebetween. This minimum spacing is maintained by a pair of laterally spaced cantilever springs 254 (only one of which is shown) which are adapted to bear against the underside of the journals 356 of the roller 352 so as to limit its downward movement under the influence of a pair of weaker springs 358 (only one being shown). As best shown in FIG. 5, the journals 356 are located in slots 360 which guide its movement toward and away from the roller 260. Each of the springs 354 is fixedly attached to the processor 200 at 362 and is located in the path of travel of the premounted transparency film frame 82, as it exits from the second chamber 16 of the camera back 10, so as to be deflected into the broken line position shown in FIG. 5. Suitable means, not shown, are provided in the processing apparatus for moving the end 74 of the film advancing apparatus from its first position, wherein it is in lighttight relation to the uppermost film frame 128 in the stack of unexposed film frames in the first chamber 14 of the camera back, to a third position (see FIG. 5), wherein an exposed film frame has been moved into the bite of the rollers 260 and 352, and back to said first position. As the premounted transparency film frame 82 enters the gap between the rollers 260 and 352, portions of the springs 354 are received within the slots 140 and 142 and are deflected downwardly by the ramped surfaces 148 and 150 of the mount 126, thereby allowing the springs 358 to gently lower the roller 352 into contact with the leading end 136 of the front surface 132 of the mount 126 at a location immediately ahead of the opening 130. Thereafter, the roller 352, which has a length slightly less than the width W of the opening 130, rides down an inclined edge 364 of the opening 130 into engagement with the film frame 128. The roller 352 continues its relative movement along the length of the film frame 128 and then rises out of engagement therewith as it rides up another inclined surface 366 of the opening 130. Finally, the trailing end 138 of the mount 126 reaches a position wherein the aforementioned portions of the cantilever springs 354 "see" the slots 144 and 146, i.e., they move up the ramped surfaces 152 and 154 and into the respective slots 144 and 146 where they gently raise the roller 352 into its original position as the mount 126 moves out of engagement therewith. The lower roller 260 has a length greater than the width W of the opening 130 but slightly less than the distance D between lateral sides of the rectangularly configured surface 156 on the bottom surface 134 of the mount 126. The roller 260 cooperates with the roller 352 in pressing the coated section 350 of the sheet material 230 into firm engagement with the underside or rear surface of the film frame 128 so as to form a lamination. As depicted in FIG. 11, the thus formed lamination of the premounted transparency film frame 82 and the length 350 of coated sheet material continues its movement from the laminating station 248 to the stripping station 250 where it will remain, as depicted in FIG. 12, until a visible image has been formed in the film frame 128 as a result of the processing liquid 306 imbibing the emulsion layer of the film frame 128.

At the end of a predetermined period of time, e.g., one or two minutes, during which the processing liquid 306 has initiated the formation of a visible image within the film frame 128, the motor 284 is energized again so as to not only drive the take-up reel 240 and the power rollers 252 and 254 in the directions shown by the corresponding arrows in FIG. 13, but also to drive, through a clutch, a drum like member 368 which is mounted in circumferential relation to the take-up reel 240. The drum-like member 368 has an opening 370 therein having a length, as measured along a line parallel with the drum's axis of rotation, approximately equal to the width of the sheet material. A cylindrically shaped member 372 is mounted along one edge of the opening 370 for engaging the non-coated side of the sheet material 230 during initial rotation of the drum 368 and take-up reel 240, as a unit, in a counterclockwise direction. As shown in FIGS. 13 and 14, such rotation of the drum 368 and take-up reel 240 results in the coated length 350 of the sheet material 230 being stripped from the premounted transparency film frame 82 as its direction is being changed by the idler roller 262. During such stripping, the stiffness of the premounted transparency film frame 82 enables it to continue along a generally horizontal path into a chute 374 where it ultimately drops into a tray 376. A generally horizontally extending surface 378 is located adjacent to the roller 262 to facilitate removal of the premounted transparency film frame 82 from the coated length 350 of the sheet material 230. The premounted transparency film frame 82 may now be removed from the tray 376 and immediately positioned within a projector for projection. While the film mount 126 has been described as a single element having a rear surface 134 with a recessed area of width D therein, it is within the scope of the invention to place a plate 165 having an aperture 167 therein within the recessed area after completion of the processing and prior to the positioning of the mount within the projector. Any suitable means may be provided for securing the plate 165 to the mount 126.

As shown in FIG. 18, the transparency film frame 128 originally contains a plurality of layers including, in sequence, a transparent base through which the film frame is exposed, an additive color screen, an image receiving layer, a stripping layer for facilitating the removal of a photosensitive layer from the image receiving layer, a photosensitive layer, and an opaque layer. After the stripping operation described above, the film frame consists of those layers shown in FIG. 19 and is identified therein by the reference character 128'.

Referring back to FIGS. 3, 13 and 14, rotation of the drum 368 and the take-up reel 240 in the counterclockwise direction through approximately 300 degrees results in the cylindrical member 372 engaging the sheet material 230 and moving it downwardly so as to locate the outwardly facing coated length 350, which is still wet, on the outside of the drum 368. Also, since the drum 368 and the take-up reel 240 are rotated as a unit, no sheet material is wrapped on the take-up reel 240. Thus, by wrapping the wet length 350 on the large circumference of the drum 368 rather than on the smaller hub of the take-up reel 240, any problem with adjacent convolutions of the sheet material sticking together because a portion of one of them is wet is obviated. The next step in the cycle is to conserve the unused length of the sheet material 230 which extends between the coated length 350 and the roller 258. Accordingly, the motor 284 is reenergized and its output directed so as to drive the power rollers 252 and 254 and the supply reel 228 in the direction of their corresponding arrows, as shown in FIG. 15, so as to rewind some of the unused sheet material 230 upon the supply reel 228. Under this driving relation, the power rollers 252 and 254 are driven so as to move the sheet material 230 at a fixed rate while the supply reel 228 is driven at a greater rate. However, the supply reel 228 has a clutch in its drive which prevents the supply reel from being driven at a rate which would move the sheet material at a rate greater than said fixed rate. During the initial rewinding of the sheet material 230, the portion thereof which is partially wrapped around the cylindrical member 372 applies a force thereto which causes the drum 368 only to rotate back into its original position as the sheet material 230, including the coated length 350, is removed from the drum 368. The rewinding continues until the coated section 350 is located between the applicator roller 314 and the roller 260, as shown in FIG. 15, at which time the motor 284 is again deenergized. When it is desired to process another premounted transparency film frame 82, the cover 278 is moved to its open position and the motor 284 is energized to drive the take-up reel 240, the power rollers 252 and 254, and the processing liquid applicator roller 314 in the directions shown in FIG. 16, thus resulting in another length 376 of the sheet material 230 being coated with the processing liquid 306. This latter length 376 is then superposed with and laminated to the exposed premounted transparency film frame 82 at the laminating station 248 and then moved toward the stripping station 250, as shown in FIG. 17.

The above described cycle relates to the processing of only one of the premounted transparency film frames 82 before the sheet material 230 has been rewound on the supply reel 228. However, a plurality of the units 82 may be processed before the sheet material 230 is rewound upon its supply reel 228. In the latter case, the exposed premounted transparency film frames would be sequentially laminated to a series of coated lengths of the sheet material 230 and stripped therefrom, as previously described, after the formation of visible images in the film frames 128. However, during the rewinding of the sheet material 230, the motor 284 would be deenergized just before the end of the last coated length of sheet material 230 to be stripped from a film frame reaches the liquid applicator roller 314.

As previously described, the processing liquid 306 degrades in the presence of oxygen. However, the processing liquid applicator 244 is provided with a self-purging system which reduces the adverse effects of oxygen upon the processing liquid 306. Specifically, during each coating operation, the motor 344 slowly drives the threaded shaft 342 toward the right, as viewed in FIG. 3, thereby causing the plug 326 to move further towards its second position near the end 320 of the container 304. This slow movement of the plug 326, during application of the processing liquid 306 to the sheet material 230 by the applicator roller 314, results in the level of processing liquid 306 in the reservoir 308 rising as processing liquid is forced from the container 304. As the level increases to a point above the egress 310, the processing liquid 306 at the top drains out of the reservoir 308 via the egress 310 and into the chamber 302 of the liquid applicator housing 300. Since it is the surface of the processing liquid 306 contained within the reservoir 308 which is most exposed to the adverse effects of the ambient atmosphere, it can readily be appreciated that skimming or removing "old" liquid at the egress 310 while simultaneously adding "new" or fresh processing liquid 306 at the bottom of the reservoir 308 results in a cleaner and more refreshed supply of liquid in the reservoir.

Since certain changes may be made in the above-described invention without departing from the scope thereof, it is intended that all matter contained in the above description or shown in the accompanying drawings shall be interpreted as illustrative and not in a limiting sense.

What is claimed is:

1. Apparatus for locating a film cassette containing a plurality of film units in position for their photographic exposure, said apparatus comprising:
   a housing having means for defining a chamber having an entrance through which a film cassette containing a plurality of individual film units and a dark slide may be inserted, the film cassette having an exposure aperture in one wall thereof which is initially rendered lighttight by the dark slide, an ingress through which an advancing member may move into the interior of the film cassette so as to engage a trailing edge of the dark slide or of one of the film units, and an egress through which the dark slide and the film units are adapted to be advanced sequentially, said housing further including means defining an exposure opening for admitting image bearing light rays to enter said chamber, said exposure opening being adapted to be located in alignment with the exposure aperture in the film cassette when the latter is secured within the chamber;
   closure means mounted adjacent said entrance for movement between a loading position wherein the film cassette may be inserted into said chamber, and a closed position; and
   an advancing member mounted in position to enter the ingress in the film cassette during initial insertion of the latter into said chamber so as to be engaged by a trailing edge of the dark slide, whereby continued insertion of the film cassette into said chamber results in the dark slide being progressively moved out of the film cassette via the egress.

2. Apparatus as defined in claim 1 wherein said advancing member progressively covers the first film unit in the film cassette to be photographically exposed in lighttight relation as the dark slide is progressively removed from the film cassette.

3. Apparatus as defined in claim 1 further including means for preventing withdrawal of the film cassette from said chamber during its insertion into said chamber.

4. Apparatus as defined in claim 3 further including means coupled to said preventing means for movement of said preventing means to a position wherein the film cassette may be withdrawn from said chamber.

5. Apparatus for sequentially locating premounted transparency frames of the self-developing type in position for exposure, said apparatus comprising:
   a housing including means defining a first chamber for receiving a film assemblage of the type comprising a film cassette having an exposure aperture in one wall thereof toward which a stack of premounted transparency frames is adapted to be resiliently biased for sequential exposure of the frames, a dark slide located between the exposure aperture and the first premounted transparency frame to be exposed, an ingress, and an egress through which the dark slide and the premounted transparency frames are adapted to be sequentially advanced, said housing further includes means defining an exposure opening through which image bearing rays are adapted to pass during the exposure of the premounted transparency frames;
   means defining a second chamber mounted adjacent said first chamber for receiving each premounted transparency frame subsequent to its exposure, said second chamber including a slot through which the exposed premounted transparency frames are adapted to be sequentially moved to a film processor;
   means for advancing the premounted transparency frames from said first chamber to said second chamber after each exposure;
   means for lightsealing said slot; and
   means engageable by a member of the film processor for moving said lightsealing means to a position in which the premounted transparency frames may be moved sequentially from said second chamber to the film processor by said advancing means.

6. Apparatus as defined in claim 5 wherein said advancing means is mounted for movement between a first position wherein it prevents the photographic exposure of a premounted transparency frame and a second position wherein it is removed from interference with such photographic exposure.

7. Apparatus as defined in claim 6 wherein said advancing means, when in said second position, is adapted for movement toward said first position so as to move an exposed premounted transparency frame from the film cassette via its egress and into said second chamber.

8. Apparatus as defined in claim 7 wherein said advancing means is adapted for movement from said first position to a third position for moving an exposed premounted transparency from said second chamber for subsequent processing of the latent image in the premounted transparency frame.

9. Apparatus as defined in claim 8 wherein said advancing means prevents exposure of one of the premounted transparency frames in the film cassette when in said third position.

10. Apparatus as defined in claim 5 wherein said housing comprises a camera back which is adapted to be attached to a main body of a camera.

11. Apparatus as defined in claim 5 further including means for coupling said second chamber to said first chamber for movement between a loading position, wherein a film cassette may be inserted into said first chamber, and a closed position.

* * * * *